(12) United States Patent
Bhardwaj

(10) Patent No.: US 10,558,476 B1
(45) Date of Patent: Feb. 11, 2020

(54) AUTOMATICALLY SELECTING A VIRTUAL MACHINE STORAGE LOCATION

(71) Applicant: VMware, Inc., Palo Alto, CA (US)

(72) Inventor: Aastha Bhardwaj, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 438 days.

(21) Appl. No.: 13/948,577

(22) Filed: Jul. 23, 2013

(51) Int. Cl.
*G06F 9/455* (2018.01)
(52) U.S. Cl.
CPC .................................. *G06F 9/455* (2013.01)
(58) Field of Classification Search
None
See application file for complete search history.

(56) References Cited

U.S. PATENT DOCUMENTS

| | | | |
|---|---|---|---|
| 9,292,350 B1* | 3/2016 | Pendharkar | G06F 9/5044 |
| 2010/0235832 A1* | 9/2010 | Rajagopal | G06F 3/0605 718/1 |
| 2013/0055249 A1* | 2/2013 | Vaghani | G06F 3/0617 718/1 |
| 2013/0254383 A1* | 9/2013 | Wray | H04L 47/70 709/224 |
| 2013/0263208 A1* | 10/2013 | Challa | G06F 21/44 726/1 |
| 2014/0130055 A1* | 5/2014 | Guha | G06F 3/0604 718/104 |

* cited by examiner

*Primary Examiner* — Sisley N Kim

(57) ABSTRACT

A computer-implemented method for automatically selecting a virtual machine storage location. The method includes receiving a selection of a level of service of a storage system for provisioning of a virtual machine; and responsive to receiving the selection of the level of service, automatically selecting a storage location for the virtual machine. The storage location is one of a plurality of storage locations compliant with the selected level of service.

12 Claims, 5 Drawing Sheets

100

400

```
┌─────────────────────────────────────────────────────────────────┐
│   PROVIDE A FIRST PLURALITY OF STORAGE PROFILES FOR A FIRST     │
│              ORGANIZATION VIRTUAL DATACENTER                    │
│                             410                                 │
│  ┌───────────────────────────────────────────────────────────┐  │
│  │ PROVIDE A FIRST PLURALITY OF PRE-DEFINED LEVELS OF SERVICE│  │
│  │       FOR THE FIRST ORGANIZATION VIRTUAL DATACENTER       │  │
│  │                          412                              │  │
│  └───────────────────────────────────────────────────────────┘  │
└─────────────────────────────────────────────────────────────────┘
                               │
                               ▼
┌─────────────────────────────────────────────────────────────────┐
│   PROVIDE A SECOND PLURALITY OFSTORAGE PROFILE FOR A SECOND     │
│              ORGANIZATION VIRTUAL DATACENTER                    │
│                             420                                 │
│  ┌───────────────────────────────────────────────────────────┐  │
│  │ PROVIDE A SECOND PLURALITY OF PRE-DEFINED LEVELS OF SERVICE│ │
│  │       FOR A SECOND ORGANIZATION VIRTUAL DATACENTER        │  │
│  │                          422                              │  │
│  └───────────────────────────────────────────────────────────┘  │
└─────────────────────────────────────────────────────────────────┘
                               │
                               ▼
┌─────────────────────────────────────────────────────────────────┐
│  RESPONSIVE TO RECEIVING A REQUEST TO PROVISION A VIRTUAL       │
│  MACHINE IN ONE OF THE FIRST ORGANIZATION VIRTUAL DATACENTER    │
│  AND THE SECOND ORGANIZATION VIRTUAL DATACENTER WITH A QUALITY  │
│  OF SERVICE REQUIREMENT OF A CORRESPONDING ONE OF THE FIRST     │
│  PLURALITY AND SECOND PLURALITY OF STORAGE PROFILES,            │
│  AUTOMATICALLY SELECTING A COMPLIANT STORAGE LOCATION FOR THE   │
│  VIRTUAL MACHINE ON ONE OF THE FIRST ORGANIZATION VIRTUAL       │
│  DATACENTER AND THE SECOND ORGANIZATION VIRTUAL DATACENTER      │
│                             430                                 │
│  ┌───────────────────────────────────────────────────────────┐  │
│  │   AUTOMATICALLY SELECT A DATASTORE FOR THE VIRTUAL MACHINE│  │
│  │                          432                              │  │
│  └───────────────────────────────────────────────────────────┘  │
└─────────────────────────────────────────────────────────────────┘
                               │
                               ▼
┌─────────────────────────────────────────────────────────────────┐
│  CREATE THE VIRTUAL MACHINE ON THE AUTOMATICALLY SELECTED       │
│                       STORAGE LOCATION                          │
│                             440                                 │
└─────────────────────────────────────────────────────────────────┘
```

FIG. 4

AUTOMATICALLY SELECTING A VIRTUAL MACHINE STORAGE LOCATION

BACKGROUND

Creating a virtual machine typically requires manual intervention. For example, an administrator must select the storage location for a virtual machine from a long list of possible storage locations. The manual intervention is unwieldy and error prone for a virtual infrastructure with a large number of datastores.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 4 depicts a method for controlling provision of storage resources for groups of users, according to various embodiments.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Embodiment of a Computing System

Figure 1:
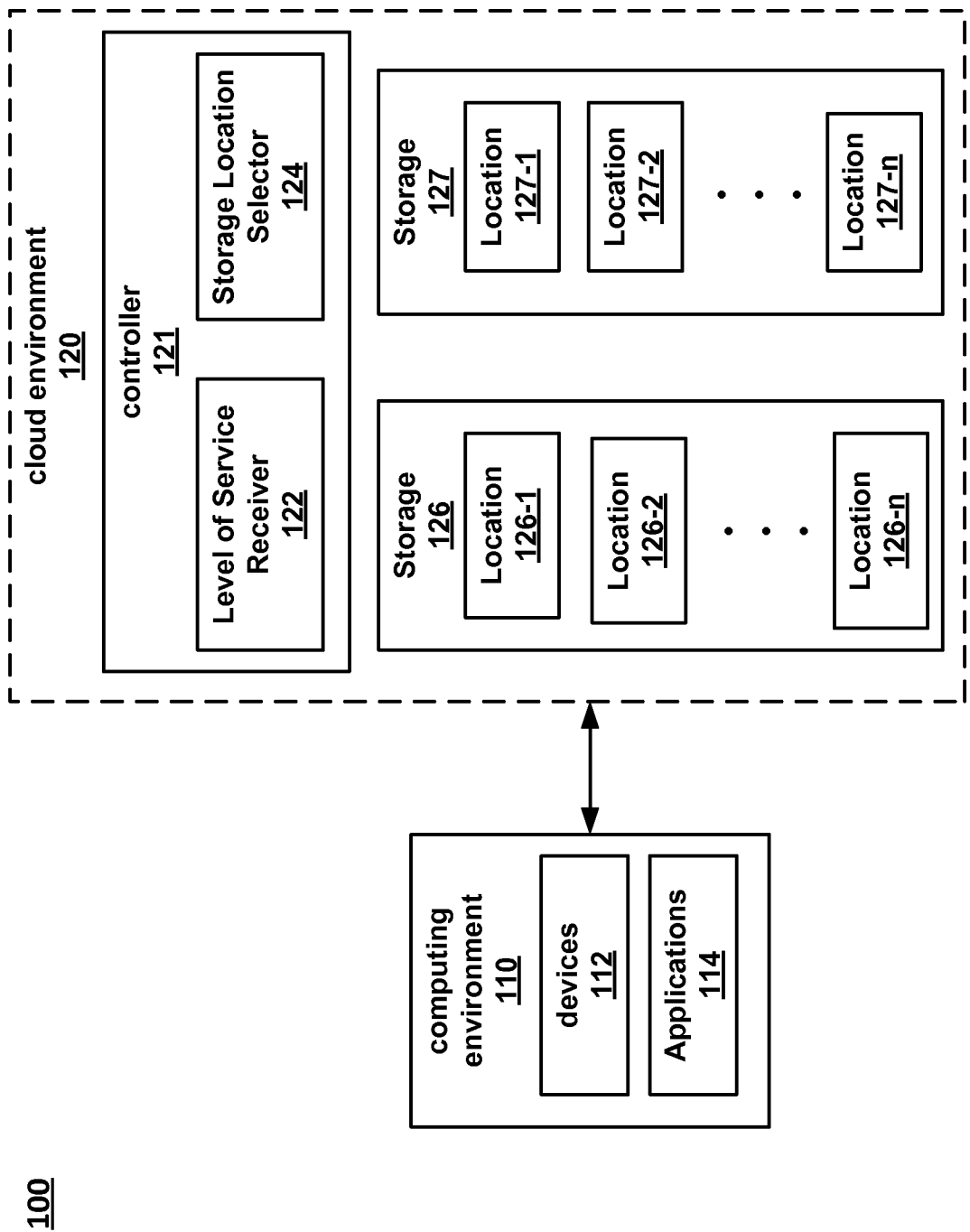
FIG. 1 is a block diagram that illustrates an embodiment of computing system.

FIG. 1 depicts a block diagram that illustrates an embodiment of computing system 100. System 100 includes, among other things, computing environment 110 and cloud environment 120. In general, computing environment 110 is communicatively coupled to cloud environment 120 and may access functionality of cloud environment 120.

Computing environment 110 includes a plurality of devices 112. Devices 112 are any number of physical and/or virtual machines. For example, in some embodiments, computing environment 110 is a corporate computing environment (e.g., enterprise computing system) that includes tens of thousands of physical and/or virtual machines (e.g., devices 112).

Devices 112 include a variety of applications, such as applications 114 (e.g., installed software). The devices may have the same installed applications or may have different installed software. The installed software may be one or more software applications from one or more vendors. In some embodiments, devices 112 access and utilize applications located in cloud environment 120.

Cloud environment 120 is a device comprising at least one processor and memory. As described herein, cloud environment 120 may be located in an Internet connected data center or a private cloud computing center coupled with one or more public and/or private networks. Cloud environment 120 typically couples with a virtual or physical entity in a computing environment (e.g., computing environment 110) through a network connection which may be a public network connection, private network connection, or some combination thereof. For example, a user in computing environment 110 may couple via an Internet connection with cloud environment 120 by accessing a web page or application presented by cloud environment 120 at a virtual or physical entity within computing environment 110.

Cloud environment 120 includes controller 121. Controller 121 is configured to, at least in part, facilitate in the provisioning of virtual machines in cloud environment 120. In one embodiment, controller 121 is a software application (e.g., VMware vCloud™ Director) or a component of a software application for administrating and controlling cloud environment 120. For example, controller 121 is a software application coupled with a centralized virtualization infrastructure management system (e.g., VMware vSphere™ and/or VMware vCenter™).

More specifically, controller 121 is configured to automatically select a storage location for a virtual machine that is to be created/provisioned in computing system 100, which will be described in further detail below. The term "automatically" as used herein, is defined as the selection of the storage location for the provisioning of a virtual machine without requiring any user input associated with selection of the storage location.

It is noted that multiple tiers of service are created prior to automatically selecting a storage location for a virtual machine. The multiple tiers of service, or levels of service are then utilized for storage location, for example, by virtual infrastructure administrators (e.g., IT professional).

The levels of service provide various advantages for both public and private clouds. For example, in a public cloud environment, the levels of service provide a cloud administrator with customer pricing models, choices of performance, etc. In a private cloud environment, the levels of service provide a cloud administrator with similar features, as described above. Additionally, the levels of service allow an administrator to more effectively allocate resources to the organizations within the enterprise.

Moreover, in various embodiments, administrators can create multiple classes of storage capacity within the same provider or organization virtual datacenter thereby using the storage more effectively.

In various embodiments, the levels of service of the storage are defined by storage profiles. Storage profiles allow an administrator (e.g., vSphere™ administrator) to define capabilities for the storage within their environment (e.g., storage 126 and storage 127 of cloud environment 120). These capabilities can then be grouped into a storage profiles.

The levels of service can be any metric and/or storage capability that is useful for the efficient provisioning of a virtual machine, such as but not limited to, latency, availability, size, etc.

In one embodiment, the level of service is the Quality of Service (QoS) requirements regarding the storage of a virtual machine.

In one example, two metrics (e.g., latency and cost) are used to differentiate storage in cloud environment 120. The two metrics are then the capabilities that are assigned to the datastores with a corresponding value.

In such an example, the capabilities may be described as:
Datastore A: Latency=High; Cost=Low
Datastore B: Latency=Low; Cost=High Storage profiles may be generated that contain the characteristics. For example, a 'Gold' storage profile is created that contains the characteristics of Latency=Low and Cost=High, which corresponds to Datastore B. Similarly, a 'Silver' storage profile may be created that contains the characteristics of Latency=High and Cost=Low, which corresponds to Datastore A.

As a result, the storage profiles are utilized for the provisioning of virtual machines, which is described in further detail below.

It should be appreciated that there may be any number of levels of service, wherein the different levels of service are based on different storage characteristics with respect to each other. For example, in one embodiment, there are three levels of service (e.g., gold, silver and bronze).

In one embodiment, different types of storage locations are compliant with a level of service. For example, location 126-1 and location 127-2 are compliant with a first level of service, wherein location 126-1 is a location in a first type of storage (e.g., redundant array of independent disks (RAID)) and location 127-2 is a location in a second type of storage (e.g., a server).

In another embodiment, the same types of storage locations are compliant with different levels of service. For example, storage 126 and storage 127 are the same types of storage systems (e.g., server). As such, each location in storage 126 and storage 127 have the same characteristics. In such an example, locations 126-1 and 127-2 are compliant with a first level of service and locations 126-2 and 127-1 are compliant with a second level of service even though locations 126-1, 126-2, 127-1, and 127-2 are the same type of storage locations.

In one embodiment, storage is automatically polled on a periodic basis to discover the storage profiles that have been created. In another embodiment, the polling of the storage is manually initiated.

It should be appreciated that storage locations, in one embodiment, are datastores. In general, a datastore represents a storage location for virtual machine files. A storage location can be a VMFS volume, a directory on Network Attached Storage, a local file system path, etc. Also, a datastore is platform-independent and host-independent. Therefore, datastores do not change when the virtual machines they contain are moved between hosts. In one embodiment, the scope of a datastore is a datacenter and the datastore is uniquely named within the datacenter. References to a virtual machine or file accessed by any host within the datacenter use a datastore path.

When a virtual machine is provisioned, it is created in a storage location. In particular, the storage location is automatically selected, which will be described in further detail below.

A level of service is received by level of service receiver 122. For example, a virtualization infrastructure administrator desires to generate a virtual machine in computing system 100. Moreover, it is desirable to provision the virtual machine in a storage location having low cost and high latency. A first level of service (of a plurality of levels of service) corresponds to storage characteristics having low cost and high latency. As such, the administrator selects the first level of service for the provisioning of the virtual machine which is received by level of service receiver 122.

Storage location selector 124 is configured to automatically select a storage location that is compliant with the selected level of service. For example, storage location selector 124 is able to determine all of the storage locations that are compliant with the selected level of service, for example, low cost and high latency. In such an example, location 126-1, 126-2 and 127-2 are among the locations that are compliant with the selected level of service (e.g., low cost and high latency). Accordingly, storage location selector 124 automatically selects one of the available storage locations that is compliant with the selected level of service, such that the virtual machine is provisioned based on the selected level of service.

It should be appreciated that storage location selector 124 may utilize various algorithms to automatically select a compliant storage location. For example, the storage location may be selected based on, storage location with the most availability, least used, location of source virtual machine that the new virtual machine will be cloned from, etc.

In one embodiment, 'any' storage location is selected. For example, an administrator is simply interested in provisioning a virtual machine and is not interested in what level of service is associated with the virtual machine. Accordingly, the 'any' storage location is selected. As such, any storage location that is available for the virtual machine to be stored upon is automatically selected by storage location selector 124.

Example Methods of Operation

Figure 2:
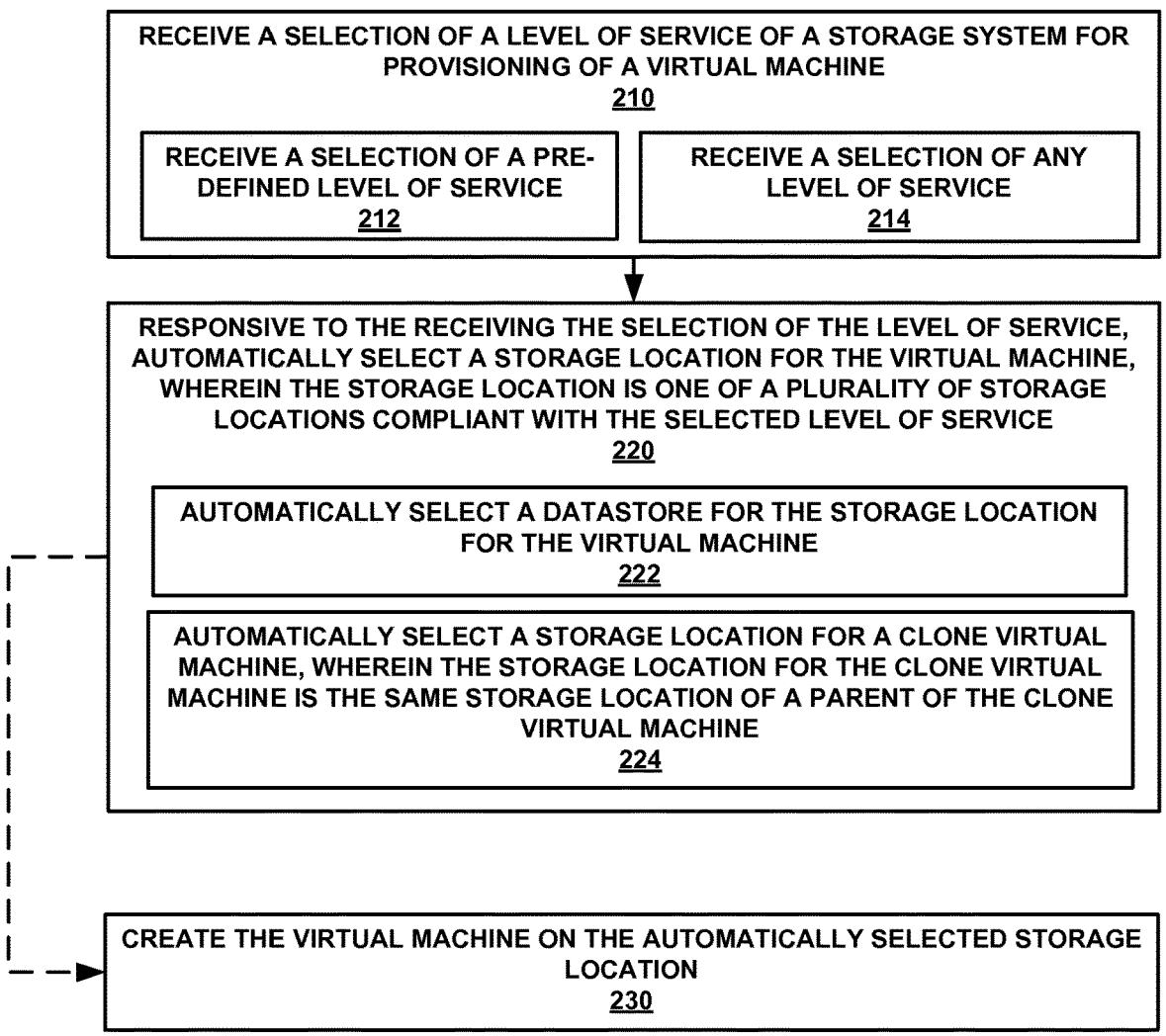
FIG. 2 depicts a method for automatically selecting a virtual machine storage location, according to various embodiments.
Figure 3:
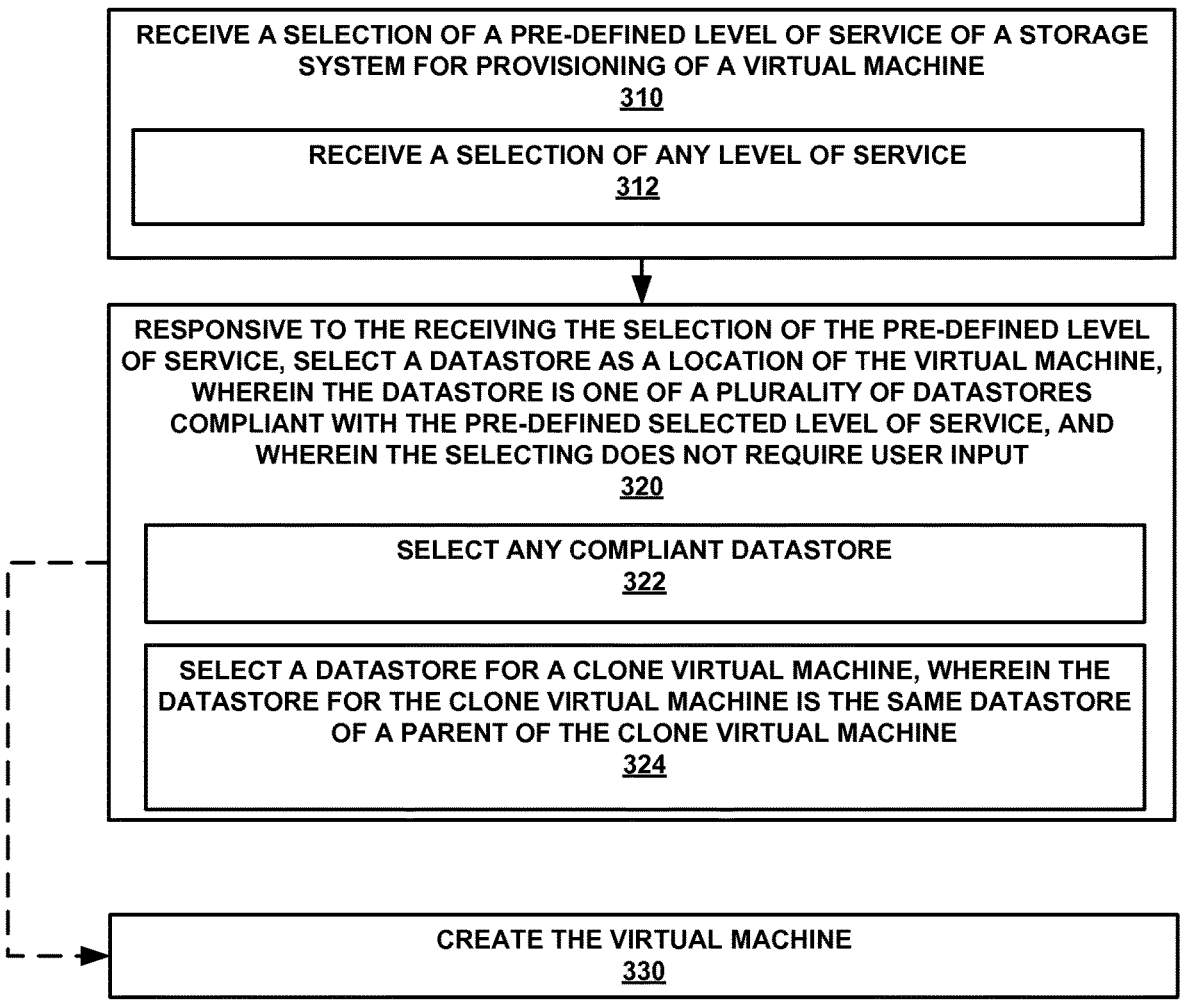
FIG. 3 depicts a method for automatically selecting a virtual machine storage location, according to various embodiments.

The following discussion sets forth in detail the operation of some example methods of operation of embodiments. With reference to FIGS. 2, 3 and 4, flow diagrams 200, 300 and 400 illustrate example procedures used by various embodiments. Flow diagrams 200, 300 and 400 include some procedures that, in various embodiments, are carried out by a processor under the control of computer-readable and computer-executable instructions. In this fashion, procedures described herein and in conjunction with flow diagrams 200, 300 and/or 400 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environment 110 and/or cloud environment 120. The computer-readable and computer-executable instructions, which reside on tangible computer readable storage media, are used to control or operate in conjunction with, for example, one or some combination of processors of the computer environment 110 and/or cloud environment 120. It is appreciated that the processor(s) may be physical or virtual or some combination (it should also be appreciated that a virtual processor is implemented on physical hardware). Although specific procedures are disclosed in flow diagrams 200, 300 and 400, such procedures are examples. That is, embodiments are well suited to performing various other procedures or variations of the procedures recited in flow diagrams 200, 300 and 400. Likewise, in some embodiments, the procedures in flow diagrams 200, 300 and 400 may be performed in an order different than presented and/or not all of the procedures described in one or more of these flow diagrams may be performed. It is further appreciated that procedures described in flow diagrams 200, 300 and 400 may be implemented in hardware, or a combination of hardware with firmware and/or software.

FIG. 2 depicts a flow diagram for a method for automatically selecting a virtual machine storage location, according to various embodiments.

Referring now to FIG. 2, at 210, a selection of a level of service of a storage system for provisioning of a virtual machine is received. For example, an administrator/manager of computing system 100 selects a first level of service (of a plurality of level of services) for a storage system (e.g., storage 126 and/or storage 127) regarding the provisioning of a virtual machine. Accordingly, level of service receiver 122 receives the first level of service selected by the administrator. The level of service or a QoS, in one example, is low cost and high latency.

At 212, in one embodiment, a selection of a pre-defined level of service is received. For example, the levels of service are classified or defined prior to the provisioning of the virtual machine.

At 214, in another embodiment, a selection of any level of service is received. For example, an IT administrator desires to provision a virtual machine and the provisioning of the virtual machine does not require any levels of service or QoS. Accordingly, the IT administrator selects 'any' storage profile. As a result, any storage location that is conducive as a location for the virtual machine may be automatically selected.

At 220, responsive to the receiving the selection of the level of service, a storage location for the virtual machine is automatically selected, wherein the storage location is one of a plurality of storage locations compliant with the selected level of service.

For example, a first set of storage locations are compliant with a first level of service, a second set of storage locations are compliant with a second level of service, and a third set of storage locations are compliant with a third level of service, wherein the levels of service are defined a priori. In response to level of service receiver 122 receiving a selection of a first level of service, storage location selector 124 automatically selects a storage location (e.g., location 127-2) that is compliant with the selected first level of service, wherein the compliant storage location is one of a plurality of storage locations that are compliant with selected level of service.

At 222, in one embodiment, a datastore for the storage location for the virtual machine is automatically selected. For example, locations 126-1, 126-2, and 126-3 are datastores that are compliant with a selected level of service. Storage location selector 124 selects location 126-1 (i.e., a datastore) because it is least used compared to locations 126-2 and 126-3.

At 224, in another embodiment, a storage location for a clone virtual machine is automatically selected, wherein the storage location for the clone virtual machine is the same storage location of a parent of the clone virtual machine. For example, a clone virtual machine is requested to be provisioned in computing system 100, wherein the parent virtual machine is located on location 127-1. Accordingly, storage location selector 124 automatically selects the location 127-1 as the storage location for the clone virtual machine because the parent virtual machine is also on location 127-1.

In another embodiment, the clone virtual machine is located at another location than the location of the source of the clone virtual machine.

At 230, in one embodiment, the virtual machine is created on the automatically selected storage location. For example, in response to storage location selector 124 selecting a storage location for the virtual machine, the virtual machine is created and subsequently provisioned on the automatically selected storage location. For instance, storage location selector 124 automatically selects a location 127-2 as the storage location for a virtual machine based on the selection of the level of service received by level of service receiver 122. As a result, the virtual machine is provisioned at location 127-2.

It is noted that any of the procedures, stated above, regarding flow diagram 200 may be implemented in hardware, or a combination of hardware with firmware and/or software. For example, any of the procedures are implemented by a processor(s) of computing environment 110 and/or cloud environment 120.

FIG. 3 depicts a flow diagram for a method for automatically selecting a virtual machine storage location, according to various embodiments.

Referring now to FIG. 3, at 310, a selection of a pre-defined level of service of a storage system for provisioning of a virtual machine is received. For example, the QoS regarding a virtual machine includes a low latency of the storage system. An IT admin of cloud environment 120 selects a first level of service (e.g., low latency) for a storage system (e.g., storage 126 and/or storage 127) regarding the provisioning of the virtual machine. Accordingly, level of service receiver 122 receives the first level of service selected by the IT admin that includes low latency.

It should be appreciated that various users may provision a virtual machine. For example, a non-IT admin user provisions a virtual machine, for example, where vCloud™ director is used as a public cloud. Also, an end user (e.g., non IT admin) is able to provision virtual machines and specify storage QoS.

Additionally, the levels of service associated with the storage systems are pre-defined prior to the provisioning of the virtual machines.

At 312, in one embodiment, a selection of any level of service is received. For example, an IT administrator desires to provision a virtual machine and the provisioning of the virtual machine does not require any levels of service or QoS. Accordingly, the IT administrator selects 'any' storage profile. As a result, any storage location that is able to store the virtual machine may be automatically selected.

At 320, responsive to the receiving the selection of the pre-defined level of service, a datastore is selected as a location of the virtual machine, wherein the datastore is one of a plurality of datastores compliant with the pre-defined selected level of service, and wherein the selecting of the datastore does not require user input. For example, a first set of datastores are compliant with a first level of service, and a second set of datastores are compliant with a second level of service, wherein the levels of service are defined a priori. In response to level of service receiver 122 receiving a selection of the second level of service, storage location selector 124 automatically selects a datastore (e.g., location 126-1) that is compliant with the selected second level of service, wherein the compliant datastore is one of a plurality of storage locations that are compliant with selected level of service.

At 322, in one embodiment, any compliant datastore is selected. For example, in response to 'any' level of service or storage profile being selected, storage location selector 124 selects any storage location that is compliant to storing the virtual machine.

At 324, in another embodiment, a datastore for a clone virtual machine is selected, wherein the datastore for the clone virtual machine is the same datastore of a parent of the clone virtual machine. For example, a clone virtual machine is requested to be provisioned in computing system 100, wherein the parent virtual machine is located on a datastore (e.g., location 126-1). Accordingly, storage location selector 124 automatically selects the same datastore (e.g., location 126-1) of the parent virtual machine as the datastore for the clone virtual machine.

At 330, in one embodiment, the virtual machine is created on the automatically selected storage location. For example, in response to storage location selector 124 selecting a storage location for the virtual machine, the virtual machine is created and subsequently provisioned on the automatically selected storage location. For instance, storage location selector 124 automatically selects a location 127-2 as the storage location for a virtual machine based on the selection of the level of service received by level of service receiver 122. As a result, the virtual machine is provisioned at location 127-2.

It is noted that any of the procedures, stated above, regarding flow diagram 300 may be implemented in hardware, or a combination of hardware with firmware and/or software. For example, any of the procedures are implemented by a processor(s) of computing environment 110 and/or cloud environment 120.

FIG. 4 depicts a flow diagram for a method for controlling provision of storage resources for groups of users, according to various embodiments.

Referring now to FIG. 4, at 410, a first plurality of storage profiles are provided for a first organization virtual datacenter. In other words, more than one storage profile can be assigned/made available to a virtual datacenter. For example, computing system 100 includes various virtual datacenters. Accordingly, a first plurality of storage profiles are provided for a first organization virtual datacenter that define capabilities for the storage within the environment.

At 412, in one embodiment, a first plurality of pre-defined levels of service is provided for a first organization virtual datacenter. For example, a first plurality of levels of service (e.g., low latency, etc.) of a storage system is provided for the virtual datacenter, wherein the levels of service are defined prior to the provisioning of the virtual machine.

At 420, a second plurality of storage profiles are provided for a second organization virtual datacenter. For example, a second organization virtual datacenter is provided a second plurality of storage profiles that define capabilities for the storage within the environment.

At 422, in one embodiment, a second plurality of pre-defined levels of service are provided for a second organization virtual datacenter. For example, a second level of service (e.g., high latency, etc.) of a storage system is provided for the virtual datacenter, wherein the level of service is defined prior to the provisioning of the virtual machine.

At 430, responsive to receiving a request to provision a virtual machine in one of the first organization virtual datacenter and the second organization virtual datacenter with a Quality of Service requirement of a corresponding one of the first plurality and second plurality of storage profiles, a compliant storage location for the virtual machine on one of the first organization virtual datacenter and the second organization virtual datacenter is automatically selected.

Continuing the example from above, if a storage location on the first virtual datacenter is compliant with a level of service of the virtual machine, then storage location selector 124 automatically selects a storage location (e.g., storage location 127-1) that is compliant with the level of service of the virtual machine.

Moreover, in one embodiment, the enterprise environment may include various groups of users (e.g., IT, testing, engineering, etc.). Accordingly, the system administrator may re-direct each distinct groups/sets of users to different organization virtual datacenters based on the needs/requirements of storage for the groups of users.

At 432, in one embodiment, a datastore for the virtual machine is automatically selected. For example, location 127-1 is automatically selected by storage location selector 124 in response to receiving a selection from level of service receiver 122.

At 440, the virtual machine is created on the automatically selected storage location. For example, storage location selector 124 automatically selects a location 127-2 as the storage location for a virtual machine based on the selection of the level of service received by level of service receiver 122. As a result, the virtual machine is provisioned at location 127-2.

It is noted that any of the procedures, stated above, regarding flow diagram 400 may be implemented in hardware, or a combination of hardware with firmware and/or software. For example, any of the procedures are implemented by a processor(s) of computing environment 110 and/or cloud environment 120.

Example Host Computing System

Figure 5:
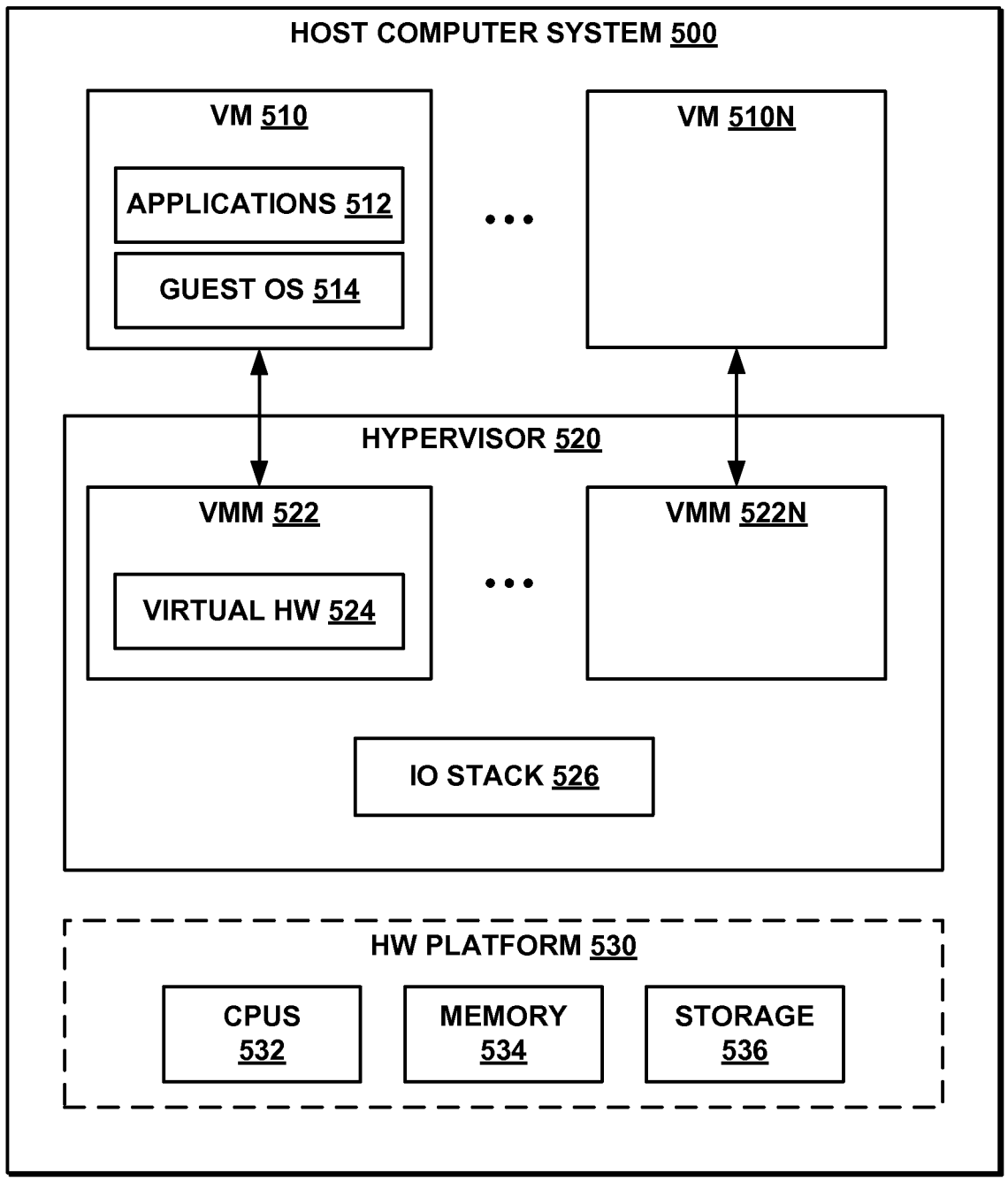
FIG. 5 depicts a host computing system, according to various embodiments.

FIG. 5 is a schematic diagram that illustrates a virtualized computer system that is configured to carry out one or more embodiments of the present invention. The virtualized computer system is implemented in a host computer system 500 including hardware platform 530. In one embodiment, host computer system 500 is constructed on a conventional, typically server-class, hardware platform.

Hardware platform 530 includes one or more central processing units (CPUs) 532, system memory 534, and storage 536. Hardware platform 530 may also include one or more network interface controllers (NICs) that connect host computer system 500 to a network, and one or more host bus adapters (HBAs) that connect host computer system 500 to a persistent storage unit.

Hypervisor 520 is installed on top of hardware platform 530 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 524 for virtual machine 510 supports the installation of guest OS 514 which is capable of executing applications 512 within virtual machine 510.

Guest OS 514 may be any of the well-known commodity operating systems, such as Microsoft Windows™, Linux™, and the like, and includes a native file system layer, for example, either an NTFS or an ext3FS type file system layer.

IOs issued by guest OS 514 through the native file system layer appear to guest OS 516 as being routed to one or more virtual disks provisioned for virtual machine 510 for final execution, but such IOs are, in reality, are reprocessed by IO stack 526 of hypervisor 520 and the reprocessed IOs are issued, for example, through an HBA to a storage system.

Virtual machine monitor (VMM) 522 and 522*n* may be considered separate virtualization components between the virtual machines and hypervisor 520 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What I claim is:

1. A computer-implemented method for automatically selecting a location to store a virtual machine which is to be created, said computer-implemented method comprising:
    receiving a selection of a level of service of a storage system for provisioning of said virtual machine which is to be created, said level of service defined prior to creation and provisioning of said virtual machine which is to be created;
    responsive to said receiving said selection of said level of service, automatically selecting said location to store said virtual machine which is to be created, wherein said location is one of a plurality of storage locations compliant with said selected level of service, said location comprised of a datastore, said datastore being platform-independent and said datastore being host-independent; and
    creating said virtual machine on said location which was automatically selected.

2. The computer-implemented method of claim 1, wherein said receiving a selection of a level of service comprises:
    receiving a selection of a pre-defined level of service.

3. The computer-implemented method of claim 1, wherein said receiving a selection of a level of service comprises:
    receiving a selection of any level of service.

4. The computer-implemented method of claim 1, wherein said automatically selecting a location to store said virtual machine which is to be created, further comprises:
    automatically selecting said datastore for said location of said virtual machine.

5. The computer-implemented method of claim 1, wherein said automatically selecting a location to store said virtual machine which is to be created, further comprises:
    automatically selecting a location for storing a clone virtual machine, wherein said location for storing said clone virtual machine is the same location of a parent of said clone virtual machine.

6. The computer-implemented method of claim 1, wherein said level of service comprises:
    a level of Quality of Service (QoS).

7. The computer-implemented method of claim 1, wherein said level of service comprises one or more of:
    storage availability, storage performance, and storage cost.

8. The computer-implemented method of claim 1, wherein said level of service comprises:
    a first plurality of pre-defined levels of service for a first organization virtual datacenter; and
    a second plurality of pre-defined levels of service for a second organization virtual datacenter.

9. A non-transitory computer-readable storage medium having instructions embodied therein that when executed cause a computer system to perform a method for selecting a location to store a virtual machine which is to be created, said method performed without requiring user input, the method comprising:
    receiving a selection of a pre-defined level of service of a storage system for provisioning of said virtual machine which is to be created, said level of service defined prior to creation and provisioning of said virtual machine which is to be created;
    responsive to said receiving said selection of said pre-defined level of service, automatically selecting a datastore as said location to store said virtual machine which is to be created, wherein said datastore is one of a plurality of datastores compliant with said selected pre-defined level of service, and wherein said selecting does not require user input, said datastore being platform-independent and said datastore being host-independent; and
    creating said virtual machine on said datastore which was automatically selected.

10. The non-transitory computer-readable storage medium of claim 9, wherein said receiving a selection of a pre-defined level of service comprises:
    receiving a selection of any level of service.

11. The non-transitory computer-readable storage medium of claim 9, wherein said selecting a datastore, further comprises:
    selecting any compliant datastore.

12. The non-transitory computer-readable storage medium of claim 9, wherein said selecting a datastore, further comprises:
    selecting a datastore for a clone virtual machine, wherein said datastore for said clone virtual machine is the same datastore of a parent of said clone virtual machine.

* * * * *